United States Patent Office 2,944,870
Patented July 12, 1960

2,944,870

NEW COLOURING PROCESS

John Reginald Atkinson, Gerald Booth, Eric Leslie Johnson, and Walter Percival Mills, Manchester, England, assignors to Imperial Chemical Industries Limited, London, England, a corporation of Great Britain No Drawing. Filed Sept. 24, 1958, Ser. No. 762,911

Claims priority, application Great Britain Oct. 4, 1957

8 Claims. (Cl. 8—39)

This invention relates to a new colouring process and more particularly it relates to a new process for the production of fast colourations on textile materials made from synthetic polymers.

It has been found that water-insoluble anthraquinone dyestuffs containing alkyl groups substituted by epoxy, chloro or bromo groups when applied from aqueous dispersion to textile materials made from synthetic polymers, for example polyamides and basically modified polyacrylonitriles, give colourations of unexpectedly high fastness to wet treatments. Colourations effected on these textile materials by the use of water-insoluble anthraquinone dyestuffs not containing these groups are in general deficient in fastness to wet treatments, and the colourations obtained by use of water-insoluble anthraquinone dyestuffs containing these groups are markedly superior in fastness to wet treatments not only in that they retain their strength of shade better but also in that staining of adjacent textile materials is much reduced. It seems probable that this fastness is due at least in part to chemical reaction of the dyestuff with the textile material.

According to the invention therefore there is provided a process for the colouration of synthetic polymeric textile materials which comprises treating the synthetic polymeric textile material with a water-insoluble anthraquinone dyestuff containing at least one epoxyalkoxy, halogenoalkoxy, epoxyalkylamino or halogenoalkylamino group which is directly attached to a carbon atom of the anthraquinone nucleus or is attached to a carbon atom of the anthraquinone nucleus through an alkoxy, alkylamino or arylamino radical.

The halogenoalkoxy, epoxyalkoxy, epoxyalkylamino or halogenalkylamino groups present in the water-insoluble anthraquinone dyestuffs may be further substituted by hydroxy, alkoxy or hydroxyalkoxy substituents which are attached to the carbon atoms present in the said groups. As specific examples of the halogenoalkoxy, epoxyalkoxy, epoxyalkylamino or halogenoalkylamino groups, which may be present in the water-insoluble anthraquinone dyestuffs as hereinbefore defined, there may be mentioned $\beta:\gamma$-epoxypropoxy, $\beta:\gamma$-epoxypropylamino, $\gamma$-chloropropoxy, $\gamma$-chloropropylamino, $\gamma$-bromopropoxy, $\gamma$-bromopropylamino, $\beta$-chloroethoxy, $\beta$-chloroethylamino, $\beta$-bromoethoxy, $\beta$-bromoethylamino, $\gamma$-chloro-$\beta$-hydroxypropoxy, $\gamma$-chloro-$\beta$-hydroxypropylamino, $\gamma$-bromo-$\beta$-hydroxypropoxy and $\gamma$-bromo-$\beta$-hydroxypropylamino.

When the epoxyalkylamino or halogenoalkylamino group is attached to a carbon atom of the anthraquinone nucleus through an alkoxy, alkylamino or arylamino radical the hydrogen atom attached to the nitrogen atom present in the epoxyalkylamino or halogenoalkylamino group can be replaced by a substituted or unsubstituted hydrocarbon radical. As examples of such substituted or unsubstituted hydrocarbon radicals there may be mentioned methyl, ethyl, propyl, cyclohexyl, benzyl, $\beta$-hydroxyethyl, halogenoethyl, halogenopropyl, $\gamma$-halogeno-$\beta$-hydroxypropyl, epoxypropyl and $\beta$-ethoxyethyl, and as examples of the alkoxy, alkylamino or arylamino radicals there may be mentioned ethoxy, ethylamino and anilino.

The water-insoluble anthraquinone dyestuff, as hereinbefore defined, or mixtures thereof may be applied to a synthetic polymeric textile material by a dyeing or printing process and it is preferred to use the water-insoluble anthraquinone dyestuff in the form of an aqueous dispersion or a re-dispersible powder. The aqueous dispersion of the water-insoluble anthraquinone dyestuff may be obtained by gravel-milling the dyestuff in water in the presence of a dispersing agent, for example the sodium salt of sulphonated naphthalene formaldehyde condensation products, sulphosuccinic acid esters, Turkey red oil and condensation products of alkylphenols with ethylene oxide, and if desired in the presence of a protective colloid, for example dextrin. If desired the aqueous dispersion so obtained may be converted to a re-dispersible powder by any of the processes known for forming re-dispersible powders.

The application of the water-insoluble anthraquinone dyestuff, as hereinbefore defined, to the synthetic polymeric textile material by a dyeing process may be carried out by immersing the synthetic polymeric textile material in a dyebath containing an aqueous dispersion of the water-insoluble anthraquinone dyestuff and heating at a temperature at or near the boiling point of the dyebath, for example at a temperature between 75° and 100° C. If desired the dyebath can be heated at temperatures above 100° C., for example at a temperature between 100° and 130° C. under super-atmospheric pressure. The dyed textile material is then removed from the dyebath, rinsed in water and dried.

The water-insoluble anthraquinone dyestuffs, as hereinbefore defined, may also be applied to the synthetic polymeric textile material by a printing process which may be effected by printing the synthetic polymeric textile material with a thickened printing paste containing an aqueous dispersion of the anthraquinone dyestuff. The printing paste may be thickened with any of the usual thickening agents, for example methyl cellulose, starch, locust bean gum, Nafka crystal gum or sodium alginate, and may contain normal adjuvants for printing pastes such as urea, thiourea or thiodiglycol or adjuvants used for the application of water-insoluble dyes such as methylated spirits, sodium m-nitrobenzenesulphonate or aqueous emulsions of sulphonated oils.

The printing paste may be conveniently applied to the synthetic polymeric textile material by printing with block, spray, stencil, screen or roller, preferably drying the printed material, and if desired steaming at atmospheric pressure or in a closed vessel at super-atmospheric pressure when a temperature above 100° C., preferably between 110° and 130° C. is required.

As examples of synthetic polymeric textile materials which may be used in the process of the invention there may be mentioned textile materials comprising polyamides, for example polyhexamethylene adipamide and the polymer from caprolactam, and modified polyacrylonitriles.

The water-insoluble anthraquinone dyestuffs, as hereinbefore defined, used in the process of the invention may be obtained by methods described in the literature or used in practice for the preparation of compounds containing the groups defined above.

For example those water-insoluble anthraquinone dyestuffs containing a γ-chloro or γ-bromo-hydroxypropylamino group may be obtained by reacting the corresponding anthraquinone compound containing a primary or secondary amino group with epichlorohydrin or epibromohydrin respectively. Those water-insoluble anthraquinone dyestuffs containing a halogenoalkylamino or halogenalkoxy group may be obtained by reacting the corresponding anthraquinone compound containing a hydroxyalkylamino or hydroxyalkoxy group with a halogenating agent. Those water-insoluble anthraquinone dyestuffs containing a γ-chloro- or γ-bromo-β-hydroxypropoxy group may be obtained by reacting the corresponding anthraquinone compounds containing a hydroxy group with epichlorohydrin or epibromohydrin respectively. Those water-insoluble anthraquinone dyestuffs containing an epoxypropoxy or epoxypropylamino group may be obtained by reacting the corresponding anthraquinone dyestuff containing a 3-chloro-2-hydroxypropoxy or 3-chloro-2-hydroxypropylamino group with potassium hydroxide.

As specific examples of the water-insoluble anthraquinone dyestuffs, as hereinbefore defined, which may be used in the process of the invention there may be mentioned 1:4 - di(N - γ - chloro - β - hydroxypropylamino)-anthraquinone,
1:4-di-(β-chloroethylamino)anthraquinone,
1:4-di-(β-bromoethylamino)anthraquinone,
1 - β - chloroethylamino - 4 - γ - chloro - β - hydroxypropylamino-anthraquinone,
1 - β - bromoethylamino - 4 - γ - chloro - β - hydroxypropylaminoanthraquinone,
1 - β - hydroxyethylamino - 4 - γ - chloro - β - hydroxypropylaminoanthraquinone,
1 - methylamino - 4 - γ - chloro - β - hydroxypropylaminoanthraquinone,
1 - ethylamino - 4 - γ - bromo - β - hydroxypropylaminoanthraquinone,
1:4-di(γ-bromopropylamino)anthraquinone,
1:4-di(γ-bromo-β-hydroxypropylamino)anthraquinone,
1-methylamino-4-β-bromoethylaminoanthraquinone,
1 - β - bromoethylamino - 4 - γ - bromo - β - hydroxypropylaminoanthraquinone,
1-isopropylamino-4-β-bromoethylaminoanthraquinone,
1 - amino - 4 - (4' - γ - chloro - β - hydroxypropoxyanilino)anthraquinone,
1 - amino - 2 - β - bromoethoxy - 4 - hydroxyanthraquinone,
1 - amino - 2 - β'' - (β' - iodoethoxy)ethoxy - 4 - hydroxyanthraquinone,
1 - amino - 2 - β'' - (β' - bromoethoxy)ethoxy - 4 - hydroxyanthraquinone,
1 - methylamino - 4 - [4' - N:N - di - (γ - chloro - β-hydroxypropyl)aminoanilino]anthraquinone,
1 - γ - chloro - β - hydroxypropylamino - 4 - [4' - N:N-di(γ - chloro - β - hydroxypropyl)aminoanilino] anthraquinone and
1:4 - di[3' - N:N - di(γ - chloro - β - hydroxypropyl)aminoanilino]anthraquinone.

By the process of the invention there are produced on the synthetic polymeric textile materials red, blue and green shades possessing excellent fastness to washing.

A preferred class of the water-insoluble anthraquinone dyestuffs as hereinbefore defined for use in the process of the invention are those water-insoluble anthraquinone dyestuffs which contain at least one halogenoalkylamino group directly attached to a carbon atom of the anthraquinone nucleus, as such dyestuffs have excellent affinity for synthetic polymeric textile materials.

The invention is illustrated but not limited by the following examples in which parts and percentages are by weight.

*Example 1*

1 part of 1:4-di(N-γ-chloro-β-hydroxypropylamino) anthraquinone is dispersed in 20 parts of water by milling in the presence of a sodium salt of a sulphonated naphthalene formaldehyde condensation product and the dispersion so obtained is added to 4,000 parts of water containing 4 parts of a condensate of ethylene oxide with a fatty alcohol. 100 parts of polyamide textile material are placed in the dyebath so obtained and the dyebath is then heated to 95° C. and maintained at that temperature for 60 minutes. The polyamide textile material is then rinsed in water, immersed for 30 minutes in a hot aqueous solution containing 0.2% of sodium carbonate and 0.1% of a condensate of ethylene oxide with an alkyl phenol, again rinsed in water and dried. The polyamide textile material is dyed a blue shade possessing very good fastness to washing.

*Example 2*

1 part of 1:4-di(N-γ-chloro-β-hydroxypropylamino) anthraquinone is dispersed in 20 parts of water as described in Example 1 and the dispersion so obtained is added to 4,000 parts of water containing 1.5 parts of oleyl sodium sulphate at 50° C. 100 parts of the basically modified polyacrylonitrile fibre manufactured by the Chemstrand Corporation and sold under their trademark "Acrilan" are placed in the dyebath so obtained and the dyebath is then heated to a temperature between 98° C. and 100° C. and maintained at that temperature for 60 minutes. The modified polyacrylonitrile fibre is then rinsed in water, immersed for 30 minutes in a hot aqueous solution containing 0.05% of sodium carbonate and 0.2% of a condensate of ethylene oxide with an alkyl phenol, again rinsed in water, and dried. The modified polyacrylonitrile fibre is dyed a blue shade possessing very good fastness to wet treatments.

*Example 3*

20 parts of a 5% aqueous dispersion of 1:4-di(N-γ-chloro-β-hydroxypropylamino)anthraquinone are mixed with 10 parts of urea, 2 parts of an aqueous emulsion of sulphonated sperm oil and pine oil, 1 part of sodium m-nitrobenzenesulphonate, 7 parts of water and 60 parts of a 30% aqueous solution of Nafka crystal gum. The printing paste so obtained is applied from a roller printing machine to a polyamide textile material. The polyamide textile material is dried and then exposed for 15 minutes to steam at atmospheric pressure. The printed polyamide textile material so obtained is rinsed in cold water and soaped at 80° C. in a solution containing 2 parts of soap in 1000 parts of water. The printed polyamide textile material is then rinsed in water and dried. A bright blue print is obtained which has excellent fastness to washing and to light.

*Example 4*

1 part of 1:4-di(N-γ-chloro-β-hydroxypropylamino) anthraquinone is dispersed in 20 parts of water as described in Example 1 and the dispersion so obtained is added to 4000 parts of water containing 4 parts of a condensate of ethylene oxide with a fatty alcohol. 100 parts of the polymerised caprolactam textile material are placed in the dyebath so obtained and the dyebath is then heated to 95° C. and maintained at that temperature for 60 minutes. The textile material is then rinsed in water, immersed for 30 minutes in a hot aqueous solution containing 0.2% of sodium carbonate and 0.1% of a condensate of ethylene oxide with an alkyl phenol, again rinsed in water and dried. The textile material is dyed a blue shade of very good fastness to washing.

The following table gives further examples of the shades obtained on polyamide textile materials when the water-insoluble anthraquinone dyestuffs listed in the second column of the table are applied to polyamide textile materials by the method described in Example 1.

| Example | Anthraquinone Dyestuff | Shade on polyamide textile materials |
|---|---|---|
| 5 | 1:4-di($\beta$-chloroethylamino)anthraquinone. | Reddish-blue. |
| 6 | 1-$\beta$-hydroxyethylamino-4-$\gamma$-chloro-$\beta$-hydroxypropylamino anthraquinone. | Do. |
| 7 | 1:4-di($\gamma$-bromopropylamino)anthraquinone. | Do. |
| 8 | 1-methylamino-4-$\beta$-bromoethylamino-anthraquinone. | Do. |
| 9 | 1-amino-4-(4'-$\gamma$-chloro-$\beta$-hydroxypropylanilino)anthraquinone. | Do. |
| 10 | 1-amino-2-$\beta$-bromoethoxy-4-hydroxy-anthraquinone. | Bluish-red. |
| 11 | 1-methylamino-4-[4'-N:N-di-($\gamma$-chloro-$\beta$-hydroxypropyl)aminoanilino]anthraquinone. | Greenish-blue. |
| 12 | 1-$\gamma$-chloro-$\beta$-hydroxypropylamino-4-[4'-N:N-di($\gamma$-chloro-$\beta$-hydroxypropyl)-aminoanilino]anthraquinone. | Do. |

What we claim is:

1. Process for the coloration of synthetic polymeric textile materials selected from the class consisting of polyamide and modified polyacrylonitrile textile materials which comprises treating the said synthetic polymeric textile materials with a water-insoluble anthraquinone dyestuff containing at least one group selected from the class consisting of $\omega$-oxiranylalkoxy, $\omega$-halogenoalkoxy, $\omega$-oxiranylalkylamino, and $\omega$-halogenoalkylamino, each group being attached to a carbon atom of the anthraquinone nucleus through a member selected from the class consisting of a direct link, an alkoxy radical, an alkylamino radical, and an arylamino radical.

2. Process as claimed in claim 1, wherein said dyestuff has an $\omega$-halogenoalkoxy group which also contains a carbinol group vicinal to the $\omega$-carbon atom.

3. Process as claimed in claim 1, wherein said dyestuff has an $\omega$-halogenoalkylamino group which also contains a carbinol group vicinal to the $\omega$-carbon atom.

4. Process as claimed in claim 1, wherein said water-insoluble anthraquinone dyestuff contains a $\gamma$-chloro-$\beta$-hydroxypropylamino group.

5. Process as claimed in claim 1, wherein said water-insoluble anthraquinone dyestuff contains a $\gamma$-bromo-$\beta$-hydroxypropylamino group.

6. Process as claimed in claim 1, wherein said water-insoluble anthraquinone dyestuff is supplied to the synthetic polymeric textile material by dyeing.

7. Process as claimed in claim 1, wherein said water-insoluble anthraquinone dyestuff is applied to the synthetic polymeric textile material by printing.

8. Synthetic textile materials selected from the class consisting of polyamide and modified polyacrylonitrile textile materials colored with a water-insoluble anthraquinone dyestuff containing at least one group selected from the class consisting of $\omega$-oxiranylalkoxy, $\omega$-halogenoalkoxy, $\omega$-oxiranylalkylamino, and $\omega$-halogenoalkylamino, each group being attached to a carbon atom of the anthraquinone nucleus through a member selected from the class consisting of a direct link, an alkoxy radical, an alkylamino radical, and an arylamino radical.

No references cited.